United States Patent

[11] 3,581,309

| [72] | Inventors | Wayne G. Shear<br>Pompano Beach, Fla.;<br>Merlin E. Olmstead, Baltimore, Md.;<br>Samuel R. Everett, Fort Lauderdale, Fla. |
|---|---|---|
| [21] | Appl. No. | 759,966 |
| [22] | Filed | Sept. 16, 1968 |
| [45] | Patented | May 25, 1971 |
| [73] | Assignee | The Bendix Corporation |

[54] CLOCK SYNCHRONIZATION WITHOUT ADDRESSING FOR COLLISION AVOIDANCE SYSTEMS
11 Claims, 3 Drawing Figs.

[52] U.S. Cl. .................................................. 343/6.8,
343/7.5
[51] Int. Cl. ...................................................... G01s 9/56
[50] Field of Search ............................................ 343/6.5, 6.5
LC, 6.8, 6.8 LC, 7.5

[56] References Cited
UNITED STATES PATENTS
3,440,652  4/1969  Bates et al. .................... 343/6.5X

*Primary Examiner*—Rodney D. Bennett, Jr.
*Assistant Examiner*—Malcolm F. Hubler
*Attorneys*—Plante, Arens and Hartz, Bruce L. Lamb and William G. Crhistoforo ABSTRACT: A means of synchronizing clocks without addressing within a cooperative collision avoidance system which utilizes the time slot of the aircraft requesting synchronization. During its time slot, an aircraft transmitting a collision avoidance message automatically requests clock synchronization. All other aircraft within the collision avoidance network which receive the synchronization request will respond in a random manner with a probability inversely proportional to the number of potential responding aircraft within the collision avoidance network. To accomplish this each cooperating aircraft is equipped to monitor the number of occupied time slots so as to determine the number of potential responding aircraft, determines the probability of its response with respect thereto and determines in accordance with the probability thus derived whether it should respond to this particular synchronization request.

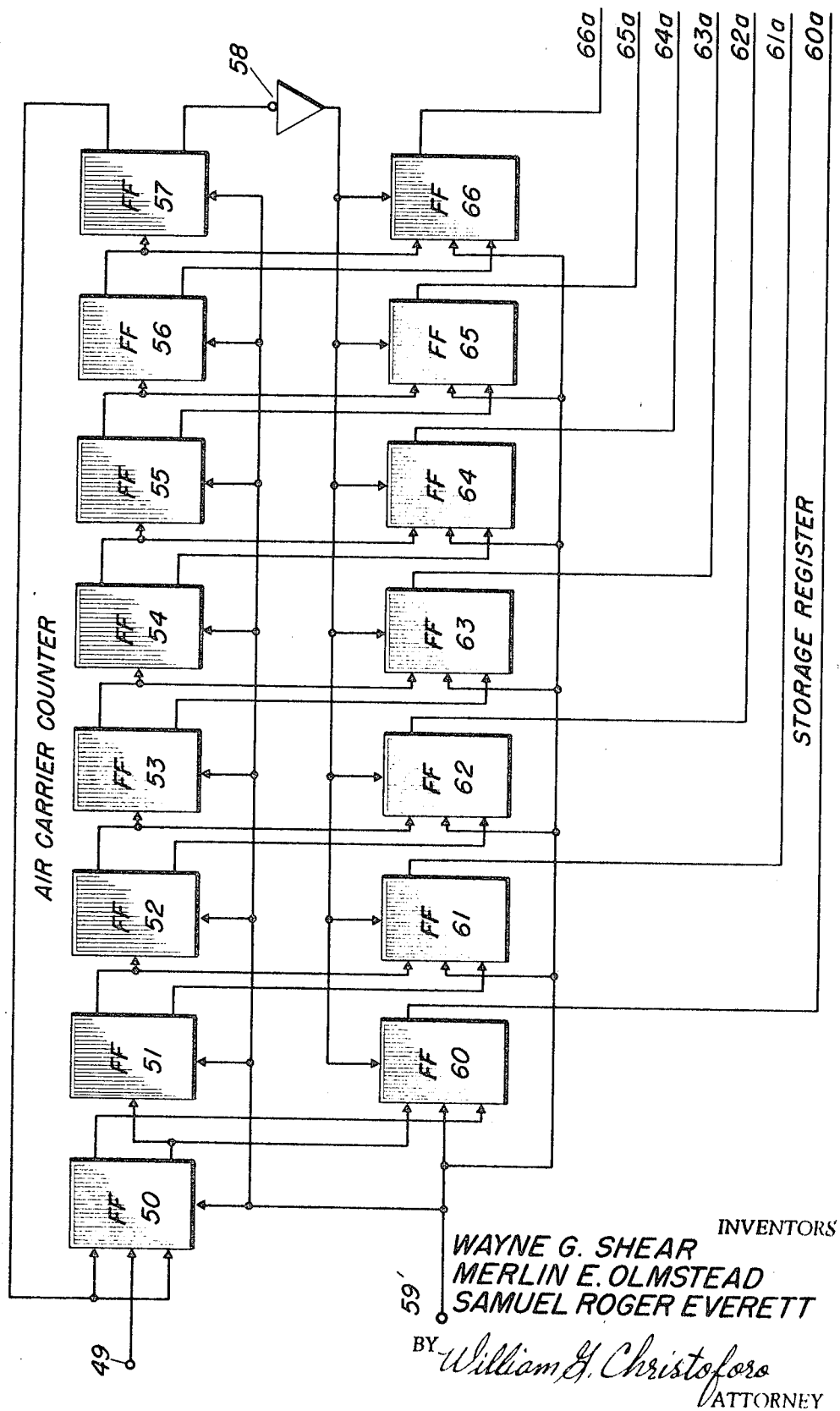

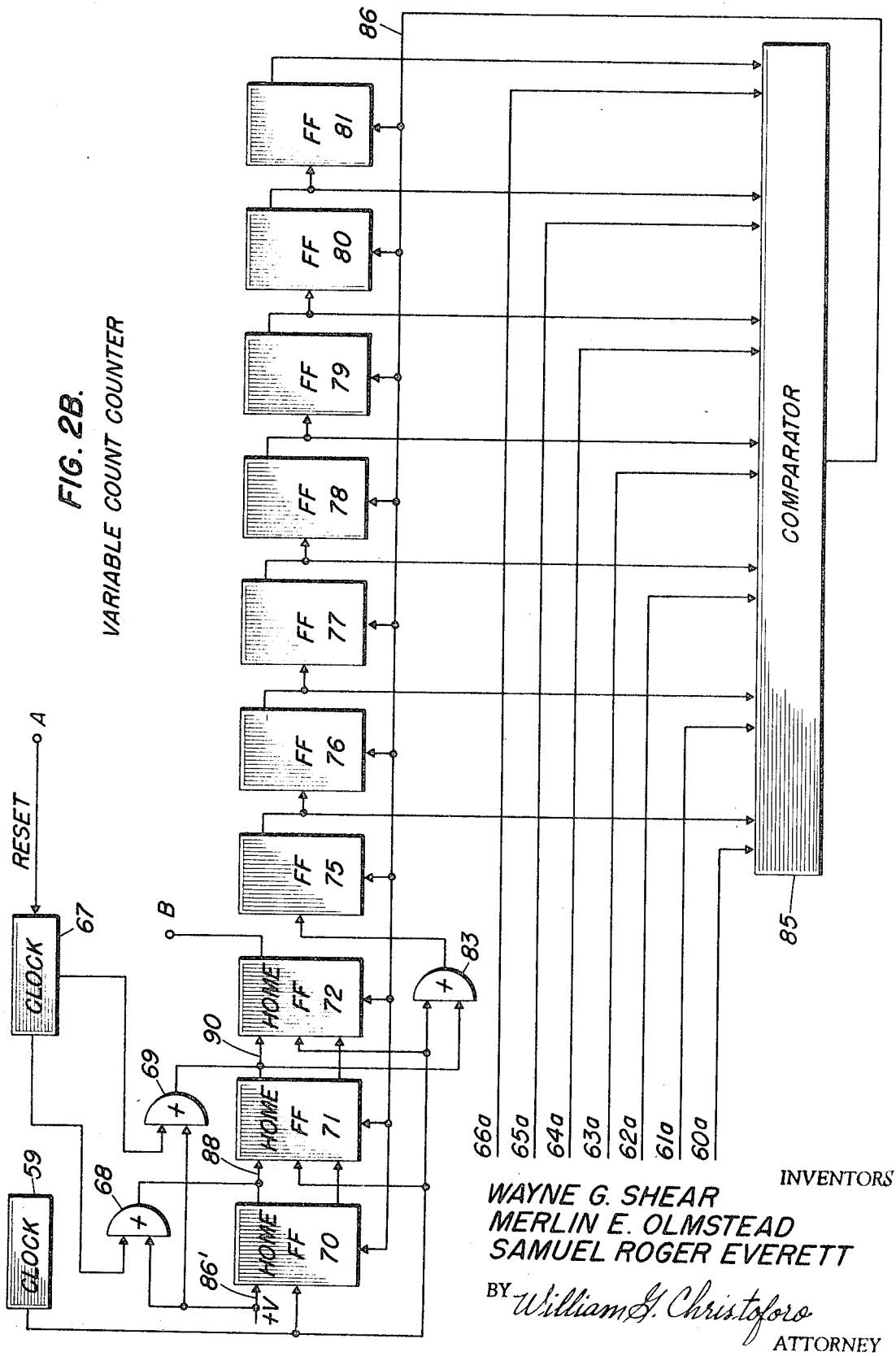

3,581,309

CLOCK SYNCHRONIZATION WITHOUT ADDRESSING FOR COLLISION AVOIDANCE SYSTEMS

BACKGROUND OF THE INVENTION

This invention relates to means for synchronizing clocks at locations remote from one another with each other and it particularly relates to means for synchronizing the airborne clocks needed to make practical a collision avoidance system utilizing the so-called master time technique wherein each cooperating aircraft is equipped with an accurate clock, either an atomic clock or a very accurately controlled crystal clock, which is synchronized with all other airborne clocks in a given anticollision net and which may also be synchronized with a master ground clock. The aforementioned collision avoidance system makes use of a system epoch which is divided into equally spaced time slots, each aircraft in the collision avoidance network occupying a separate time slot. The importance of synchronizing the clocks within this type of collision avoidance network is seen from the fact that collision avoidance messages are transmitted one way during the time slot assigned to a particular aircraft. The aircraft, on a carrier frequency assigned to its time slot, transmits a collision avoidance message containing as a minimum information as to its altitude and altitude rate. A cooperating aircraft which receives this message determines the range of the transmitting aircraft by comparing the time of receipt of the message with the beginning of the time slot as determined by the clock on the receiving aircraft and computes the range rate between the transmitting and receiving aircraft by consideration of the doppler shift of the received frequency. It can thus be seen that small errors in time or frequency will result in large errors of range and range rate.

It is proposed that airborne clocks be started and time synchronized in large terminal areas by reference to ground stations operating on a single worldwide time. It is additionally proposed that airborne stations propagate time synchronization signals after leaving the area of ground station influences when so requested through aircraft to aircraft synchronization.

The system previously proposed for synchronizing clocks on airborne stations required that each clock within the collision avoidance network grade itself in a hierarchy in accordance with the probable accuracy of its time. This grading process takes into account the accuracy of the time standard which last synchronized the clock now grading itself. Each aircraft in the collision avoidance network includes as a part of its collision avoidance message information as to its position in the time hierarchy. Each aircraft, of course, listens to the collision avoidance messages as they are transmitted during the individual occupied time slots and determines which time slot is associated with the aircraft in the collision avoidance network standing highest in the time hierarchy. Thereafter, an aircraft requiring synchronization addresses its synchronization request to the aircraft highest in the time hierarchy and grades its own time in accordance therewith. Because of inherent errors in synchronizing to another reference, the synchronized aircraft must grade itself at a lower hierarchy level than the synchronizing aircraft. Using this system it is possible for an aircraft in a high hierarchy level, but having a clock which is experiencing abnormally high clock drift, to dominate a collision avoidance network which is out of contact with ground stations so as to cause the particular network time to deviate markedly from standard world time. Additionally, extra equipment is required for determining and recording which time slot should be addressed for time synchronization.

SUMMARY OF THE INVENTION

A means for synchronizing clocks within a collision avoidance network has been devised which eliminates both the need for recording the time hierarchies of other aircraft within the network and the need for addressing a particular aircraft within the network. It is, thus, an object of this invention to provide a system for synchronizing clocks without addressing.

It is another object of this invention to provide a system for synchronizing clocks which does not depend upon recording the time hierarchy standing of other aircraft within the collision avoidance network.

As is well known to those persons working in the collision avoidance art the currently defined collision avoidance system divides real time into system epochs with the epochs being farther divided into time slots, with each time slot being assigned to a different aircraft within a collision avoidance network. During its assigned own time slot, an aircraft transmits on a frequency assigned to the time slot and which frequency is accurately known by all other aircraft in the collision avoidance network, a collision avoidance message which includes as a minimum, a relatively long frequency burst, known as the doppler burst, which starts at a precise time with respect to the beginning of the time slot and an altitude pulse whose position with respect to the doppler pulse is correlative to the altitude of the aircraft. Other information may be included in the message, for example, an altitude rate pulse whose position with respect to the doppler burst is correlative to the altitude rate of the aircraft; however, it is not necessary for an understanding of the principles and embodiment of the invention to consider the complete content of the collision avoidance message.

The epochs are further divided into odd and even epochs with the odd epochs being called ground epochs and the even epochs being called air epochs. In the first time slot of the ground epoch each ground station transmits a coded pulse triad identifying this epoch as a ground epoch. It will be remembered that ground stations operate on a single worldwide time and hence ground station time is considered to be absolutely correct time. During the first time slot of the even epoch each cooperating aircraft transmits a pulse coded triad identifying this epoch as an air epoch. During an odd epoch a ground station treats each collision avoidance message which it hears as a synchronization request and responds during that time slot with clock synchronization information. During the air epochs, each aircraft treats each collision avoidance message which it receives as a synchronization request and responds in a random, probabilistic manner in accordance with the teachings of this invention as will be explained below.

Every aircraft in the collision avoidance network keeps a count of the number of time slots occupied by aircraft qualified to give synchronization information. This implies that certain aircraft within the collision avoidance network are occupying time slots but are not qualified to give synchronization information. It is planned that general aviation aircraft will be equipped with modified modified, less expensive, collision avoidance equipment including less stable clocks which will allow them to transmit and receive collision avoidance messages and to have their clocks synchronized by ground stations or other aircraft within the collision avoidance network, but which will not permit them to respond to synchronization requests because of their poor quality clocks. It is thus another object of this invention to provide a modified, less expensive, clock synchronization means which will permit a clock so equipped to be synchronized but which itself cannot synchronize other clocks.

When an aircraft which is qualified to respond to synchronization requests hears a collision avoidance message it examines a random counter which has certain predetermined "Home" positions and which counts randomly applied pulses to a maximum count, which is determined by the population of qualified aircraft heard and then repeats. The aircraft will respond with synchronization information only if the random counter is in a "Home" position when the request is heard. Thus, only a certain percentage of synchronization requests heard will be answered and the determination as to whether any given request is answered will be made in a random, probabilistic manner.

An aircraft which is receiving time synchronization information from a ground station will disregard synchronization information received from airborne stations as ground station time is considered as absolute time.

In an extremely low density environment, which is out of contact with a ground station, there should be a high probability of reply from any particular qualified aircraft, so that the clocks within the environment will be synchronized to some arbitrary standard even though this may not be absolute time. An aircraft, after opening in such a thinly populated environment and then rejoining a main community, would be quickly assimilated. He would note whether he was in touch with a ground station and if so would synchronize his clock therewith. If he cannot synchronize with a ground station he will synchronize with the other airborne stations, quickly updating himself to the average community time. Thereafter, upon hearing a ground station, he will synchronize himself therewith.

DESCRIPTION OF THE DRAWINGS

FIGS. 2A and 2B comprise a block diagram showing the probabilistic counter of FIG. 1 in greater detail.

DESCRIPTION OF THE PREFERRED EMBODIMENT

Figure 1:
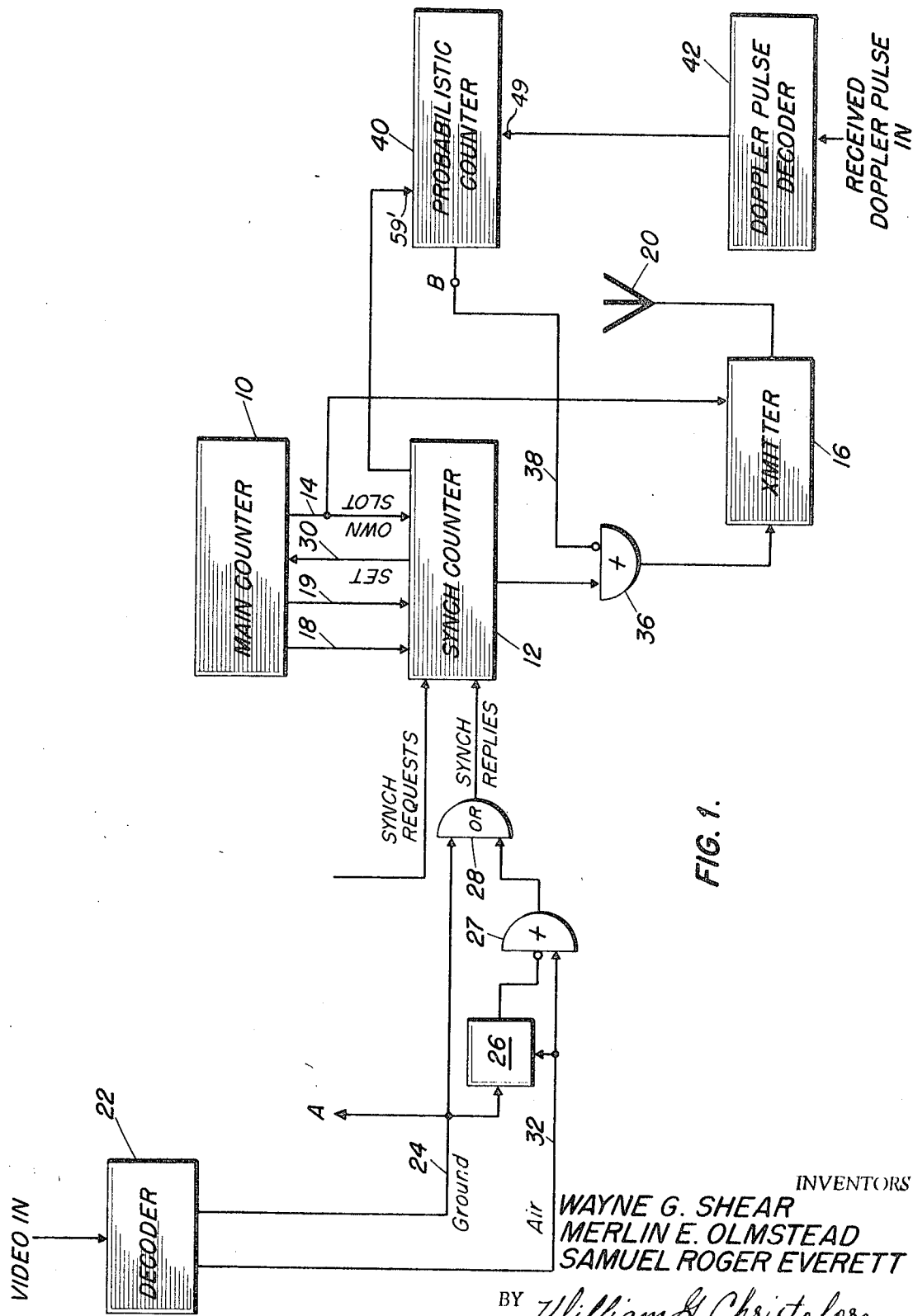
FIG. 1 is a block diagram of the invention.

Referring to FIG. 1 there is seen some of the elements of a cooperative collision system as installed in an aircraft including a main counter 10 and a synchronization counter 12, both of which elements are well known in the art. Briefly, main counter 10 comprises an accurate clock and a binary counter along with means responsive to signals generated by the synchronization counter 12 to synchronize both the frequency and the phase of the clock output. The binary counter contained in main counter 10 counts continuously, in response to clock pulses generated by the accurate clock, this clock having been started and synchronized to an external time standard. Counter 10 keeps track of the odd and even epochs, the time slots therein and this particular aircraft's own time slot.

Synchronization counter 12 also comprises a binary counter driven by the accurate clock, but having the characteristic ability of being able to count at full speed or half speed. This is accomplished, briefly, by applying the clock frequency signals either to the first stage of the binary counter to accomplish half speed counting or to the second stage of the binary counter through gates which are responsive to various extremely applied signals to accomplish full speed counting.

Assume now the main counter 10 has been properly started and synchronized to absolute time and is properly counting the system epochs and the time slots. Assume additionally that main counter 10 is now counting through the odd or ground epoch. Fifteen microseconds after the start of own time slot this counter sends a signal along line 14 to transmitter 16 which is thus triggered to transmit the 200 microsecond long doppler pulse which comprises the first part of the collision avoidance message as previously described. The transmitter immediately thereafter also transmits information concerning own aircraft's altitude and altitude rate, the means for effecting this transmission being well known in the art. Additionally, at the end of the 200 microsecond doppler pulse, which corresponds to a slot time of 215 microseconds, main counter 10 sends a start signal to the synchronization counter 12 along start line 18. Synchronization counter 12 in response thereto begins to count at half speed.

The collision avoidance message which is transmitted by transmitter 16 via antenna 20 will be received by all cooperating aircraft within range and decoded for its collision avoidance message informational content. It will also be remembered that during the odd or ground epoch any ground station receiving a collision message will treat the message as a synchronization request. The ground station which receives this particular collision avoidance message will compare the time of receipt of the message with the time from the beginning of the time slot as determined by its clock. The ground station then initiates a synchronization reply comprised of a unique pulse triad which is transmitted from the ground station at a slot time which is related to the synchronization error between the two clocks. How this slot time is derived will be explained below. The ground station reply is received at the aircraft and demodulated with the video being applied to decoder 22 which recognizes the unique ground station synchronization reply pulse triad to generate a single pulse on line 24. This latter pulse is applied through OR gate 28 to synchronization counter 12 so as to trigger this counter to start counting at full speed. When synchronization counter 12 reaches a predetermined count a main counter correction signal is sent along line 30 to main counter 10, thereby synchronizing this latter counter with the ground station. The theory underlying this method of synchronizing the main counter is well known to those familiar with master time techniques as used in collision avoidance systems. Briefly, time slot length has been set by the aircraft industry at 1500 microseconds, full counting speed of the synchronization counter 12 has been set at 10 megahertz and half speed has been set at 5 megahertz. There has also been defined a slot time of 1419.2 microseconds for the arrival of the synchronization reply when the interrogator is synchronized with the donor. Due to delays in decoding the unique pulse triad which comprises the ground station response the logic takes as reference a slot time of 1440 microseconds. From a slot time of 215 microseconds, which it will be remembered is the slot time at which the synchronization counter was started, to 1440 microseconds the synchronization counter at the 5 megahertz rate will count to 6125. It then charges speed and accumulates 600 more counts at a 10 megahertz rate before reaching the end of the time slot (slot time of 1500 microseconds). Thus, when synchronization counter 12 reaches a count of 6725 the end of the time slot is signified and the signal on line 30 sets main counter 10 to immediately start the next time slot.

The ground synchronization reply appearing on line 24, in addition to resetting synchronization counter 12, also sets flip-flop 26 which thus applies an inhibiting signal to AND gate 27. Thereafter, during the next epoch, which is the even or air epoch, synchronization replies from air stations which will appear on line 32 having been decoded by decoder 22, will find gate 27 inhibited and thus will not be able to pass through to synchronize synchronization counter 12. This is, of course, desirable because ground station replies are derived from absolute time and thus are more accurate than air synchronization replies. The air synchronization reply resets flip-flop 26 so that in the absence of an alternate ground synchronization reply gate 27 will be uninhibited and the air synchronization reply can be applied to the synchronization counter 12. Flip-flop 26 might suitably take the form of a counter so that the absence of two or more consecutive ground replies would be required before an air synchronization reply would be effective to synchronize synchronization counter 12. Of course, in the absence of any ground synchronization replies, all air synchronization replies become effective.

In all time slots during the even or air epoch, other than own time slot, all received 200 microsecond doppler bursts are treated as synchronization requests as follows. Main counter 10 sends a start signal via line 19 to synchronization counter 12 at slot time 15 microseconds. In response to the start signal synchronization counter 12 begins to count at full speed.

When a doppler burst is received by the system receiver, in addition to the burst being used for collision avoidance purposes, it is also applied as a synchronization request to the synchronization counter 12 which in response thereto changes speed and counts at the half rate of 5 megahertz until the counter detects counter number 7021. At this count the counter generates a pulse which, if gate 36 is uninhibited, will pass therethrough to transmitter 16. Transmitter 16 includes a coder which generates from this pulse a fine synchronization triad which has a unique spacing signifying that it is an air synchronization response. This response is then radiated via antenna 20 to the interrogating aircraft.

At a rate of 5 megahertz the number 7021 represents 1404.2 microseconds which corresponds to the location of the leading edge of the fine synchronization reply triad as specified by the latest Air Transport Association specifications. The Air Transport Association has specified that a synchronization reply triad received at a predetermined slot time by an interrogating aircraft signifies that the clock of the interrogating and interrogated aircraft are synchronized. This predetermined time has been defined as 1419.2 microseconds slot time which is the 1404.2 microseconds required to count to 7021 at the 5 megahertz rate plus the 15 microseconds delay at the beginning of the time slot in starting the counter. It should be remembered that during the synchronization request transit time between interrogating and interrogated aircraft the synchronization counter was counting at full speed. Hence, once synchronization counter 12 accumulates the number of 7021 slot time is actually less than the 1419.2 microseconds by the signal transit time from the interrogator to the interrogated aircraft. It should thus be obvious that under the conditions described, if the interrogated and interrogating clocks are synchronized, the synchronization reply will arrive at the interrogating aircraft at slot time 1419.2 microseconds and any deviation from this slot time is a measure of the synchronization error. This same method of formulating a synchronization response is used by a ground station during the ground epochs except that the synchronization triad in that case uniquely identifies the response as a ground response.

It will be remembered that gate 36 could have been inhibited by a signal appearing on line 38, so that the pulse generated by synchronization counter 12 at counter 7021 would not be able to pass therethrough. This inhibiting signal is generated by probabilistic counter 40 after consideration of four collision avoidance network variables. These variables comprise:

1. The number of qualified responding aircraft within the collision avoidance network.
2. The quality of the clock time on the interrogated aircraft as determined by the fact whether interrogated aircraft is in contact with a ground station.
3. The quality of clock time at the interrogated aircraft as determined by the length of time the interrogated aircraft has been out of contact with a ground station.
4. The desired probability of reply desired as a system parameter.

FIGS. 2A and 2B show in greater detail the probabilistic counter 40 which determines whether the interrogated aircraft will respond to a specific synchronization request, and to which reference should now be made. The probabilistic counter includes an air carrier counter comprised of flip-flops 50 to 57, a storage resistor register comprised of flip-flops 60 to 66, a variable count counter comprised of flip-flops 75 to 81 and three "Home" flip-flops 70 to 72, and a comparator 85. The air carrier counter counts the number of aircraft within the collision avoidance network which are qualified to give time synchronization replies. The collision avoidance system processes received doppler bursts in the doppler pulse decoder 42 shown in FIG. 1 to determine whether they are 200 microseconds in length, this length of doppler burst being transmitted only by aircraft which are qualified to give synchronization replies. When the doppler pulse decoder determines the doppler burst to be 200 microseconds long it generates a single pulse which is applied to terminal 49, which is seen in FIGS. 1 and 2A to be an input terminal of probabilistic counter 40, so as to cause the air carrier counter to count once for each 200 microsecond burst received. During the system epoch the air carrier counter continues to count the number of qualified aircraft within the collision avoidance network. At the start of the next epoch a pulse is generated by synchronization counter 12 which appears on terminal 59', which is seen in FIGS. 1 and 2A to be a second input terminal of probabilistic counter 40. This pulse is applied to the air carrier counter to reset flip-flops 50 to 57 and additionally gates the storage register so as to transfer the counter contained in the air carrier counter into the storage register comprised of flip-flops 60 to 66. It will be noted that the outputs of flip-flop 50 are reversed before being applied to flip-flop 60 so that actually an extra count of one is transferred from the air carrier counter into the storage register. It should also be noted that the air carrier counter does not repeat, that is, once filled this counter remains filled until reset by a signal on terminal 59'. When this counter fills, flip-flop 57 generates a signal which is applied through inverter 58 to immediately store this maximum possible number in the storage register. Also note that the number stored in the storage register at all times appears on lines 60a to 66a.

A free running clock 59 continually counts into the variable count counter, when gate 83 is open which, in the configuration shown, counts to a maximum of 128 and repeats if not reset earlier by a signal on line 86 as will be explained below. The count stored in the storage register is compared with the count of the variable count counter in comparator 85 which, when these two counts are the same, generates the reset signal on line 86' which resets the variable count counter and the three "Home" flip-flops 70, 71 and 72 which are seen to be connected as a shift register receiving as an input on line 86' a voltage signal +V from a voltage source not shown. Assuming now that gates 68 and 69 are closed, as soon as flip-flop 72 is reset the signal on terminal B disappears. Terminal B is also seen in FIG. 1, as the output of the probabilistic counter 40. When the signal thereon disappears the inhibiting signal from line 38 is removed and gate 36 opens so that any synchronization reply pulses generated by synchronization counter 12 during this time may pass through gate 36 and be transmitted in triad form as a synchronization reply. It will also be noted that for the conditions stated gate 83 is closed while flip-flop 71 is reset. Thus, for the first two clock 59 pulses generated after generation of the reset signal on line 86, no clock pulses can pass through gate 83 so that the variable count counter will not accumulate these first two pulses. It should also be noted that flip-flop 72 remains in the reset state until the third clock 59 pulse, has shifted the +V signal into flip-flop 72, so that during this time gate 36 is open. It should now be obvious that for the system shown when operating in a collision avoidance network of N qualified responding aircraft the probability that this aircraft will respond to any particular synchronization request is 3/(N+1). (Remember that the number of qualified aircraft in the collision avoidance network plus one was entered into the storage register.) Thus one criteria of the probabilistic reply requirements is now met, that is, the probability of reply should depend upon the number of qualified responding aircraft within the collision avoidance network.

Clock 67 comprises a reset timer which in this embodiment is described in digital form and which suitably includes a counter, a frequency source for strobing the counter, and gating means for resetting the counter in response to a signal appearing on terminal A, which is also seen in FIG. 1, which signal signifies that this collision avoidance system is being synchronized by a ground station. Clock 67 also suitably includes a second gating means which generates the gate 68 and 69 qualifying signals. Gates 68 and 69 are sequentially qualified by clock signals when clock 67 counts to predetermined counts, so that these gates remain closed as long as this collision avoidance system remains synchronized by a ground station. Assume now the clock 67 has counted to a first predetermined count so that gate 68 is qualified and gate 69 is unqualified. Voltage from voltage source 86 can now pass through gate 68 to energize line 88 so that flip-flop 70 is effectively removed from the "Home" circuit. Now only the first two clock pulses after the reset signal will find the variable count counter in the "Home" position. The probability of this aircraft responding to a synchronization request has now dropped to 2/(N+1). If the station should remain out of contact with a ground station while clock 67 counts to a second predetermined count, gate 69 becomes qualified and voltage is transferred to line 90, thus effectively removing both flip-flops 70 and 71 from the homing circuit. The probability of this station responding to a synchronization request now drops to 1/(N+1). It should now be obvious that the probability that an airborne station will respond to a synchronization request depends upon the number of qualified aircraft in the network and the quality of the potential responding station's clock. Additionally, it should be obvious that the basic probability of response can be varied by varying either the number of counting or "Home" flip-flops.

The described means for synchronizing clocks within a collision avoidance system without addressing will provide sampling of all potential donors. However, to insure that on one particular airborne station responds at a greater or lesser rate than it should as might be the case if its variable count counter became synchronized or almost synchronized with time slot occurrence, it is necessary that synchronization requests be not only probabilistically but also randomly replied to. This randomness is introduced into the system by using as clock 59 in FIG. 2 a frequency source of poor quality. Additionally, since synchronization requests might be received in adjacent time slots and it is desirable that a potential responding station determine for each request received whether to respond, the full cycle time of the variable count counter should be less than the time slot's duration. With a clock 59 frequency of approximately 1 megahertz the variable count counter will count through its range a number of times during each time slot even in densely populated collision avoidance networks.

Concern has been expressed with the high cost of equipping an aircraft with collision avoidance systems which utilize the master time technique, in that it is felt that this high cost will deter the owners of smaller aircraft from properly equipping their aircraft. For any cooperative collision avoidance system it is necessary that the airborne clocks be synchronized with one another, however, in the synchronization system here taught it is envisioned that certain stations will operate which by design will be incapable of providing synchronization, thus allowing these stations to be more inexpensively produced. These inexpensive stations will, of course, require regular synchronization of their poor quality clocks. However, since these minimum stations need not address another station in order to receive a synchronization response, as required in previous systems, considerable savings will be effected. It is only required that airborne stations qualified to reply to synchronization requests be able to recognize these minimum stations so that they will not be included in the count of qualified responding stations. To accomplish this, it is merely necessary to code the doppler burst, suitably by shortening it to a 190 microsecond long transmission. The 190 microsecond doppler burst is sufficiently long to allow determination of range rate at a receiving aircraft. Also, the 190 microsecond burst length is sufficiently foreshortened over the 200 microsecond burst length so as to allow it to be distinguished by fairly simple means. In light of the fact that the clocks on the various aircraft will be synchronized or very nearly synchronized with one another the means for so distinguishing between the 190 and 200 microsecond burst lengths should be obvious to one skilled in the art.

Although we have shown what we consider to be the preferred embodiment of our invention, certain other alterations and modifications will also become apparent to one skilled in the art, so that we do not wish to limit our invention to the specific form shown. Accordingly we hereby claim as our invention the subject matter including modifications and alterations thereof encompassed by the true scope and spirit of the appended claims.

What we claim is:

1. In a collision avoidance system utilizing master time techniques for transmitting and receiving collision avoidance messages between individual airborne units of said system wherein each said airborne unit includes a clock and transmits its collision avoidance message including a synchronization request during an assigned unique own time slot in a system epoch on a radio frequency assigned to said own time slot real time being divided into said epochs and wherein all other airborne units within a collision avoidance network receive said transmitted collision avoidance message, means for responding to said synchronization request in a random, probabilistic manner in said time slot comprising;

counting means responsive to all synchronization requests received during one said epoch for counting the number of airborne units transmitting collision avoidance messages within said collision avoidance network;

probabilistic means for generating inhibiting signals whose time duration is correlative to the number of said airborne units as determined by said counting means; and, means responsive to said synchronization requests for generating and transmitting a synchronization reply, said generating and transmitting means being disabled by said inhibiting signals.

2. A responding means as recited in claim 1 wherein said epochs comprise alternate ground and air epochs and said epochs are divided into time slots and wherein said collision avoidance system includes at least one ground station having a ground station clock for keeping absolute time and for responding to synchronization requests received during said ground epochs with a uniquely coded synchronization response, said responding means additionally including:

means for receiving ground station synchronization responses in own time slot;

means responsive to said received ground station synchronization response for generating an upgrading signal; and, means responsive to said upgrading signal for decreasing the time duration of said inhibiting signals.

3. A responding means as recited in claim 2 wherein said upgrading signal generating means comprises:

clock means reset by said received ground station synchronization response for generating said upgrading signal during a first predetermined time period after being reset and for generating a downgrading signal after the elapse of a second predetermined time period; and with additionally, means responsive to said downgrading signal for increasing the time duration of said inhibiting signals.

4. A responding means as recited in claim 1 with additionally means for generating an epoch start signal at the beginning of each said epoch and wherein said counting means comprises:

means responsive to each received synchronization request for generating a count signal;

a first counter reset by said epoch start signals for counting said count signals; and, a storage register including means responsive to said epoch start signals for transferring the count in said first counter into said storage register, said inhibiting signal generated by said probabilistic means being correlative to the count in said storage means.

5. A responding means as recited in claim 4 wherein said inhibiting signal generating means comprises:

means for generating a train of first clock pulses;

a second counter reset by a reset signal and including "Home" positions for counting said first clock pulses, said inhibiting signal being generated when said second counter is out of said "Home" positions; and, means comparing the count stored in said storage register with said second counter count for generating said second counter reset signal.

6. A responding means as recited in claim 5 wherein said means for generating said train of first clock pulses comprises a poor quality clock.

7. A responding means as recited in claim 6 wherein said first and second counters comprise first and second binary counters and said storage register comprises a binary storage register.

8. A responding means as recited in claim 7 wherein said first counter can count only to a predetermined maximum count and includes means activated when said maximum count is reached for immediately transferring said maximum count into said storage register and for retaining said maximum count in said first counter until reset by said epoch start signals.

9. A responding means as recited in claim 7 wherein said second counter comprises:
   a plurality of "Home" position binary elements arranged to count said first clock pulses;
   a plurality of counting binary elements arranged to count clock pulses applied thereto, the count contained in said counting elements being applied to said comparing means; and,
   gating means responsive to a predetermined state of said "Home" position elements for applying said first clock pulses to said counting elements.

10. A responding means as recited in claim 9 wherein said epochs comprise alternate ground and air epochs said epochs being divided into time slots and wherein said collision avoidance system includes at least one ground station having a ground station clock for keeping absolute time for responding to synchronization requests received during said ground epochs with a uniquely coded ground response and wherein said responding means additionally comprises:

means for receiving ground station synchronization responses in own time slot;
clock means reset by said received ground station synchronization responses for recording the time duration since last received ground station synchronization response, said clock means generating an upgrading signal when said recorded time duration is less than a first predetermined time duration, and generating a downgrading signal when said recorded time duration is more than a second predetermined time duration;
means responsive to said upgrading signal for increasing the number of "Home" position binary elements in said second counter; and,
means responsive to said downgrading signal for decreasing the number of "Home" position binary elements in said second counter.

11. A responding means as recited in claim 9 wherein said second counter elements are arranged to count from a predetermined minimum count to a predetermined maximum count and then to repeat until reset by said second counter reset signal, said second counter remaining out of said "Home" positions until reset.